(12) United States Patent
Kang et al.

(10) Patent No.: US 9,529,122 B2
(45) Date of Patent: Dec. 27, 2016

(54) POLARIZING PLATE INCLUDING HARD COATING FILM

(71) Applicant: LG CHEM, LTD., Seoul (KR)

(72) Inventors: Joon-Koo Kang, Daejeon (KR); Yeong-Rae Chang, Daejeon (KR); Sung-Don Hong, Daejeon (KR); Soon-Hwa Jung, Daejeon (KR); Eun-Kyu Her, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/425,572

(22) PCT Filed: Jul. 29, 2013

(86) PCT No.: PCT/KR2013/006779
§ 371 (c)(1),
(2) Date: Mar. 3, 2015

(87) PCT Pub. No.: WO2014/035062
PCT Pub. Date: Mar. 6, 2014

(65) Prior Publication Data
US 2015/0234097 A1 Aug. 20, 2015

(30) Foreign Application Priority Data

Sep. 3, 2012 (KR) .................. 10-2012-0097139
Jul. 26, 2013 (KR) .................. 10-2013-0089106

(51) Int. Cl.
*G02B 1/14* (2015.01)
*C09D 133/08* (2006.01)
*G02B 1/04* (2006.01)

(52) U.S. Cl.
CPC .............. *G02B 1/14* (2015.01); *C09D 133/08* (2013.01); *G02B 1/04* (2013.01)

(58) Field of Classification Search
CPC ............. G02B 1/04; G02B 1/105; G02B 1/14; G02B 5/30; C09D 133/08
USPC .................................................. 359/483.01
See application file for complete search history.

(56) References Cited

U.S. PATENT DOCUMENTS

| | | | | |
|---|---|---|---|---|
| 6,300,464 B2 * | 10/2001 | Morijiri | ................ | C08G 75/08 523/427 |
| 2008/0152870 A1 * | 6/2008 | Takada | .................. | B82Y 20/00 428/174 |
| 2009/0016209 A1 * | 1/2009 | Ikeda | ....................... | C08J 5/18 369/284 |
| 2009/0214871 A1 * | 8/2009 | Fukuda | ................... | C09D 4/00 428/413 |
| 2009/0244710 A1 * | 10/2009 | Tsuno | .................... | G02B 1/105 359/601 |
| 2010/0104879 A1 * | 4/2010 | Okano | .................... | G02B 1/105 428/447 |
| 2010/0167068 A1 | 7/2010 | Horio | | |
| 2011/0124823 A1 * | 5/2011 | Hayashi | ................ | C08G 18/10 525/424 |
| 2011/0151146 A1 * | 6/2011 | Okano | ....................... | C08J 7/04 428/1.33 |
| 2011/0250442 A1 * | 10/2011 | Castro | ................... | B82Y 10/00 428/336 |
| 2011/0273646 A1 * | 11/2011 | Fukagawa | ................. | C08J 5/18 349/96 |
| 2012/0229423 A1 * | 9/2012 | Takamiya | .............. | G02B 1/105 345/175 |
| 2012/0270027 A1 * | 10/2012 | Hwang | ................... | C09D 4/00 428/220 |
| 2015/0140279 A1 * | 5/2015 | Kang | .................... | G02B 1/105 428/174 |
| 2015/0148443 A1 * | 5/2015 | Kang | ...................... | C08J 7/042 522/64 |
| 2015/0203711 A1 * | 7/2015 | Kang | ....................... | C08J 5/18 428/209 |

FOREIGN PATENT DOCUMENTS

| | | | | |
|---|---|---|---|---|
| CN | 102012532 A | | 4/2011 | |
| JP | 2000214791 A | * | 8/2000 | .............. G02B 1/10 |
| JP | 2002-265650 A | | 9/2002 | |
| JP | 2008-116596 A | | 5/2008 | |
| JP | 2008-150484 A | | 7/2008 | |
| JP | 2008-310286 A | | 12/2008 | |
| JP | 2009-204725 A | | 9/2009 | |
| JP | 2010-085985 A | | 4/2010 | |
| JP | 2011201087 A | * | 10/2011 | .............. G02B 1/10 |
| KR | 10-1998-020031 A | | 6/1998 | |
| KR | 10-2007-0111352 A | | 11/2007 | |
| KR | 10-0852561 B1 | | 8/2008 | |
| KR | 10-0852562 B1 | | 8/2008 | |
| KR | 10-2010-0026014 A | | 3/2010 | |
| KR | 10-2010-0028648 A | | 3/2010 | |
| KR | 10-2010-0041992 A | | 4/2010 | |
| KR | 10-2010-0130367 A | | 12/2010 | |
| TW | 200907401 A | | 2/2009 | |
| WO | 2010/024431 A1 | | 3/2010 | |
| WO | 2011/040541 A1 | | 4/2011 | |

* cited by examiner

OTHER PUBLICATIONS

International Search Report and Written Opinion for PCT/KR2013/006779, dated Oct. 24, 2013 together with English translation of International Search Report, 11 pages.

*Primary Examiner* — Frank Font
(74) *Attorney, Agent, or Firm* — Rothwell, Figg, Ernst & Manbeck, P.C.

(57) ABSTRACT

The present invention relates to a polarizing plate including a hard coating film, and, more particularly, to a polarizing plate including a hard coating film which exhibits high hardness and superior physical properties. The polarizing plate according to the present invention is high in hardness, scratch resistance, durability, light resistance, and light transmittance and can thus be efficiently utilized in a variety of fields.

13 Claims, No Drawings

POLARIZING PLATE INCLUDING HARD COATING FILM

This application is a 35 U.S.C. §371 National Phase Entry Application from PCT/KR2013/006779, filed on Jul. 29, 2013, and designating the United States, which claims priority under 35 U.S.C. §119 to Korean Patent Application No. 10-2012-0097139, filed on Sep. 3, 2012, and to Korean Patent Application No. 10-2013-0089106, filed on Jul. 26, 2013, which are all hereby incorporated by reference in their entireties.

BACKGROUND OF THE INVENTION

1. Field of the Invention

The present invention relates to a polarizing plate including a hard coating film, and, more particularly, to a polarizing plate including a hard coating film which exhibits high hardness and superior physical properties.

This application claims the benefit of Korean Patent Application No. 10-2012-0097139, filed on Sep. 3, 2012, and Korean Patent Application No. 10-2013-0089106, filed on Jul. 26, 2013, which are all hereby incorporated by reference in their entireties into this application.

2. Description of the Related Art

A liquid crystal display (LCD) is one of a variety of flat panel displays which are currently widely available. Typically, an LCD is configured such that a liquid crystal layer is interposed between a thin film transistor (TFT) array substrate and a color filter substrate. When an electric field is applied to electrodes of the array substrate and the color filter substrate, liquid crystal molecules of the liquid crystal layer interposed therebetween are differently arranged, thereby displaying an image.

Meanwhile, a polarizing plate is provided outside the array substrate and the color filter substrate. The polarizing plate enables selective transmission of light in a specific direction among light from a backlight unit and light passed through the liquid crystal layer, thus controlling polarization.

The polarizing plate includes a polarizer for polarizing light in a predetermined direction and a protective film attached to the polarizer to support and protect the polarizer. With the recent trend of manufacturing thin and slim display devices, attempts are being made to design a polarizing plate so as to externally expose the outermost layer of the polarizing plate. Upon manufacturing polarizing plates, poor quality polarizing plates may result from scratching, which undesirably increases defective rates of panels.

In order to achieve a film having high hardness and wear resistance, coating films for a hard coating layer are proposed. An increase in surface hardness of the hard coating layer involves an increase in the thickness of the hard coating layer. However, a thicker hard coating layer, although increasing the surface hardness, is more prone to setting shrinkage which leads to wrinkling or curling with the concomitant production of cracks or exfoliations, and thus thick hard coating layers are difficult to employ in practice.

Recently, several methods have been proposed for conferring high hardness on hard coating films, without the problems of cracking and setting shrinkage-induced curling. Korean Patent Application Publication No. 2010-0041992 discloses a composition for a hard coating film using a binder resin including a UV curable polyurethane acrylate oligomer, without the use of a monomer. However, this hard coating film has a pencil hardness of about 3H and thus has insufficient strength.

Also, formation of a hard coating layer having a thickness of 20 µm or more is devised to enhance pencil hardness on a plastic substrate. Although the hard coating film thus obtained is improved in hardness, it has poor impact resistance and thus may crack or break even under low impact, and may severely curl during the manufacture process, making it difficult to manufacture, by conventional techniques, hard coating films having high hardness with good physical properties. Hence, the development of a useful hard coating film having high hardness and impact resistance is required.

SUMMARY OF THE INVENTION

Accordingly, the present invention has been made keeping in mind the above problems occurring in the prior art, and an object of the present invention is to provide a polarizing plate including a hard coating film which exhibits high hardness, scratch resistance and transparency, and generates neither curling nor cracking because of high processability.

In order to accomplish the above object, the present invention provides a polarizing plate, comprising:

a polarizer; and a hard coating film formed on at least one side of the polarizer, the hard coating film comprising a supporting substrate and a hard coating layer formed on at least one side of the supporting substrate, the hard coating layer comprising a photocurable crosslinking copolymer of a tri- to hexa-functional acrylate monomer and a photocurable elastic polymer and inorganic particles dispersed in the photocurable crosslinking copolymer.

According to the present invention, the polarizing plate includes a hard coating film which can exhibit high hardness, scratch resistance and transparency and generates neither curling nor cracking thanks to high processability, and can thus be efficiently applied to a variety of displays.

DESCRIPTION OF THE PREFERRED EMBODIMENTS

The present invention addresses a polarizing plate, comprising:

a polarizer; and a hard coating film formed on at least one side of the polarizer, the hard coating film comprising a supporting substrate and a hard coating layer formed on at least one side of the supporting substrate, the hard coating layer comprising a photocurable crosslinking copolymer of a tri- to hexa-functional acrylate monomer and a photocurable elastic polymer and inorganic particles dispersed in the photocurable crosslinking copolymer.

In the following description, the terms "first," "second," and the like are used to explain various elements, and these terms are merely used to differentiate a certain element from other elements.

The terms used herein are merely intended to explain specific examples and not to limit the present invention. As used herein and in the appended claims, "a," "an," and "the" include plural references unless the context clearly dictates otherwise. In this application, the terms "comprise," "include" or "have" are used to designate the presence of features, steps, elements or combinations thereof described in the specification, and should be understood so as not to exclude presence or additional probability of one or more different features, steps, elements or combinations thereof.

The above detailed descriptions of embodiments of the invention are not intended to be exhaustive or to limit the invention to the precise form disclosed above. While specific embodiments of, and examples for the invention are described above for illustrative purposes, various equivalent modifications are possible within the scope of the invention, as those skilled in the relevant art will recognize.

Hereinafter, a detailed description will be given of a polarizing plate according to the present invention.

According to an embodiment of the present invention, a polarizing plate comprises a polarizer; and a hard coating film formed on at least one side of the polarizer, the hard coating film comprising a supporting substrate and a hard coating layer formed on at least one side of the supporting substrate, the hard coating layer comprising a photocurable crosslinking copolymer of a tri- to hexa-functional acrylate monomer and a photocurable elastic polymer and inorganic particles dispersed in the photocurable crosslinking copolymer.

A polarizer exhibits a property making it able to extract only light that vibrates in one direction from light incident while vibrating in different directions. This property may be achieved by stretching polyvinyl alcohol (PVA) having iodine absorbed thereto under strong tension. For example, more specifically, a polarizer may be formed by swelling a PVA film in an aqueous solution, dyeing the swollen PVA film with a dichroic material to impart polarization performance to the film, stretching the dyed PVA film to arrange the dichroic material parallel to a stretch direction, and correcting the color of the stretched PVA film. However, the polarizing plate of the present invention is not limited thereto.

In one embodiment of the present invention, a hard coating film may be formed on each of both sides of the polarizer.

In another embodiment of the present invention, a hard coating film may be formed on one side of the polarizer, and a protective film may be formed on the other side of the polarizer. Any resin for the protective film may be used without particular limitation so long as it is a transparent resin which is typically useful in terms of protecting the polarizer. Specific examples thereof may include polyester such as polyethyleneterephthalate (PET), polyethylene such as ethylene vinyl acetate (EVA), a cyclic olefin polymer (COP), a cyclic olefin copolymer (COC), polyacrylate (PAC), polycarbonate (PC), polyethylene (PE), polymethylmethacrylate (PMMA), polyetheretherketone (PEEK), polyethylenenaphthalate (PEN), polyetherimide (PEI), polyimide (PI), methyl methacrylate (MMA), a fluorine resin, triacetylcellulose (TAC), etc. Preferably useful as the protective film is a triacetylcellulose (TAC) film.

The polarizer and the hard coating film or the protective film may be laminated by means of an adhesive or the like, thereby adhering them. The adhesive useful therefor is not particularly limited so long as it is known in the art. Examples of the adhesive may include a one-part or two-part PVA adhesive, a polyurethane adhesive, an epoxy adhesive, a styrene butadiene rubber (SBR) adhesive, a hot melt adhesive, etc., but the present invention is not limited thereto.

In the hard coating film of the polarizing plate according to the present invention, any material for the supporting substrate on which the hard coating layer is formed may be used so long as it is a typical transparent plastic resin, without particular limitation in terms of methods or materials for manufacturing supporting substrates such as stretched or unstretched films. Specific examples of the supporting substrate may include polyester such as polyethyleneterephthalate (PET), polyethylene such as ethylene vinyl acetate (EVA), a cyclic olefin polymer (COP), a cyclic olefin copolymer (COC), polyacrylate (PAC), polycarbonate (PC), polyethylene (PE), polymethylmethacrylate (PMMA), polyetheretherketone (PEEK), polyethylenenaphthalate (PEN), polyetherimide (PEI), polyimide (PI), triacetylcellulose (TAC), methyl methacrylate (MMA), a fluorine resin, etc. The supporting substrate may be provided in the form of a single layer structure, or a multilayer structure including two or more layers composed of the same or different materials, as necessary, but is not particularly limited.

According to an embodiment of the present invention, the supporting substrate may be a substrate including polyacrylate or triacetylcellulose.

Although the thickness of the supporting substrate is not particularly limited, it may fall in the range of about 30 to about 1,200 μm or about 50 to about 800 μm.

The hard coating film of the present invention includes a hard coating layer formed on at least one side of the supporting substrate, and the hard coating layer includes a photocurable crosslinking copolymer of a tri- to hexa-functional acrylate monomer and a photocurable elastic polymer and inorganic particles dispersed in the photocurable crosslinking copolymer.

As such, according to an embodiment of the present invention, the thickness ratio of the supporting substrate and the hard coating layer may be about 1:0.5 to about 1:2 or about 1:0.5 to about 1:1.5. When the thickness ratio of the supporting substrate and the hard coating layer falls in the above range, the resulting hard coating film is less prone to curling or cracking and may manifest high hardness.

The photocurable crosslinking copolymer contained in the hard coating layer is a copolymer in which a photocurable elastic polymer is crosslinked with a tri- to hexa-functional acrylate monomer.

As used herein, the term "acrylate" is intended to encompass acrylate, methancrylate, and derivatives thereof with various substituents.

As used herein, the term "photocurable elastic polymer" refers to a polymer which is elastic and contains a functional group that undergoes UV light-triggered crosslink polymerization.

According to an embodiment of the present invention, the photocurable elastic polymer may have an elongation of about 15% or more, for example, about 15 to about 200%, about 20 to about 200%, or about 20 to about 150%, as measured by ASTM D638.

The photocurable elastic polymer is crosslink polymerized with the tri- to hexa-functional acrylate monomer and then cured to give a hard coating film, conferring flexibility and impact resistance to the hard coating film.

According to one embodiment of the present invention, the photocurable crosslinking copolymer may comprise 5 to 20 weight parts of the photocurable elastic polymer and 80 to 95 weight parts of the tri- to hexa-functional acrylate monomer, based on 100 weight parts of the photocurable crosslinking copolymer. The presence of the photocurable crosslinking copolymer wherein the tri- to hexa-functional acrylate monomer and the photocurable elastic polymer are crosslink polymerized with each other at the above weight ratio may result in sufficient impact resistance and good physical properties.

According to an embodiment of the present invention, the photocurable elastic polymer may be a polymer or oligomer having a weight average molecular weight of about 1,000 to about 600,000 g/mol or about 10,000 to about 600,000 g/mol.

The photocurable elastic polymer may comprise at least one selected from the group consisting of polycaprolactone, a urethane acrylate polymer and polyrotaxane.

Among the polymers usable as the photocurable elastic polymer, polycaprolactone is formed by the ring-opening polymerization of caprolactone, and has excellent physical properties such as flexibility, impact resistance, durability and the like.

A urethane acrylate polymer has excellent elasticity and durability because of a urethane bond retained therein.

Polyrotaxane is a polymer of rotaxane, a mechanically-interlocked molecular architecture consisting of a dumbbell-shaped molecule which is threaded through a cyclic moiety (macrocycle). The two components of rotaxane are kinetically trapped since the ends of the dumbbell (stoppers) are larger than the internal diameter of the ring and prevent disassociation of the components since this would require significant distortion of the covalent bonds.

In accordance with one embodiment, the photocurable elastic polymer may include a rotaxane compound comprising a cyclic moiety (macrocycle) in which lactone compounds with a (meth)acrylate moiety conjugated to the end thereof and are bonded each other; a thread moiety held within the macrocycle; and stoppers provided at both ends of the thread moiety so as to prevent dissociation of the macrocycle.

No particular limitations are imposed on the macrocycle if it is large enough to surround the thread moiety. The macrocycle may include a functional group such as a hydroxyl group, an amino group, a carboxyl group, a thiol group, an aldehyde group or the like, which may react with other polymers or compounds. Specific examples of the macrocycle may include α-cyclodextrin, β-cyclodextrin, γ-cyclodextrin and mixtures thereof.

Furthermore, the thread may be used without limitation as long as it is generally linear in shape with a predetermined weight or greater. Preferably, a polyalkylene compound or a polylactone compound may be used in the thread. Specifically, a polyoxyalkylene compound including an oxyalkylene repetitive unit of 1 to 8 carbon atoms or a polylactone compound including a lactone repetitive unit of 3 to 10 carbon atoms may be used in the thread.

Meanwhile, the stopper may be appropriately adjusted depending on the characteristics of the rotaxane compound to be prepared. For example, the stopper may include at least one selected from the group consisting of a dinitrophenyl group, a cyclodextrin group, an amantane group, a trityl group, a fluorescein group and a pyrene group.

The polyrotaxane compound has superior scratch resistance and may thus exhibit self-repair when scratched or externally damaged.

The hard coating layer of the present invention is formed by photocuring a composition including the photocurable elastic polymer, thereby imparting high hardness and flexibility to the hard coating film, especially, preventing damage by external impact to thus ensure high impact resistance.

Examples of the tri- to hexa-functional acrylate monomer may include trimethylolpropane triacrylate (TMPTA), trimethylolpropane ethoxy triacrylate (TMPEOTA), glycerin-propoxylated triacrylate (GPTA), pentaerythritol tetraacrylate (PETA), dipentaerythritol hexaacrylate (DPHA), etc. These tri- to hexa-functional acrylate monomers may be used alone or in combination.

The hard coating layer includes inorganic particles dispersed in the photocurable crosslinking copolymer.

According to an embodiment of the present invention, the inorganic particles may be inorganic nanoparticles having a particle size of about 100 nm or less, about 10 to about 100 nm, or about 10 to about 50 nm. Examples of the inorganic particles may include silica particles, aluminum oxide particles, titanium oxide particles, zinc oxide particles, etc.

The inorganic particles in the hard coating layer make an additional contribution to improving the hardness of the hard coating film.

According to an embodiment of the present invention, the hard coating layer may contain, based on 100 weight parts thereof, about 40 to about 90 weight parts of the photocurable crosslinking copolymer and about 10 to about 60 weight parts of the inorganic particles, or about 50 to about 80 weight parts of the photocurable crosslinking copolymer and about 20 to about 50 weight parts of the inorganic particles. Given the amounts of the photocurable crosslinking copolymer and the inorganic particles within the ranges set forth above, the hard coating film can be formed with excellent physical properties.

Meanwhile, the hard coating layer of the present invention may further include a surfactant, a yellowing inhibitor, a leveling agent, an antifouling agent and the like, which are additives typically used in the art to which the present invention belongs, in addition to the above-mentioned photocurable crosslinking copolymer and inorganic particles. Here, the amount of the additive is may be variously adjusted to the degree that the physical properties of the hard coating film of the present invention are not degraded. Its amount is not particularly limited, but preferably ranges from about 0.1 to about 10 weight parts, based on 100 weight parts of the photocurable crosslinking copolymer.

According to an embodiment of the present invention, for example, the hard coating layer may include a surfactant as an additive. The surfactant may be a mono- or bi-functional fluoro-acrylate, a fluorine surfactant, or a silicon surfactant. In this context, the surfactant may be contained in a dispersed or crosslinked form in the photocurable crosslinking copolymer.

Also, the hard coating layer may include a yellowing inhibitor as an additive. The yellowing inhibitor may be a benzophenone compound or a benzotriazole compound.

The hard coating layer may be formed by photocuring a hard coating composition comprising a binder monomer for the photocurable crosslinking copolymer, inorganic particles, a photoinitiator, an organic solvent, and optionally an additive.

Examples of the photoinitiator may include, but are not limited to, 1-hydroxy-cyclohexyl-phenyl ketone, 2-hydroxy-2-methyl-1-phenyl-1-propanone, 2-hydroxy-1-[4-(2-hydroxyethoxy)phenyl]-2-methyl-1-propanone, methylbenzoylformate, α,α-dimethoxy-α-phenylacetophenone, 2-benzoyl-2-(dimethylamino)-1-[4-(4-morpholinyl)phenyl]-1-butanone, 2-methyl-1-[4-(methylthio)phenyl]-2-(4-morpholinyl)-1-propanone, diphenyl(2,4,6-trimethylbenzoyl)-phosphine oxide, bis(2,4,6-trimethylbenzoyl)-phenylphophine oxide, etc. Furthermore, the photoinitiator may be commercially available, such as those sold under brand name, Irgacure 184, Irgacure 500, Irgacure 651, Irgacure 369, Irgacure 907, Darocur 1173, Darocur MBF, Irgacure 819, Darocur TPO, Irgacure 907, and Esacure KIP 100F. These photoinitiators may be used alone or in combination.

Examples of the organic solvent may include alcohols such as methanol, ethanol, isopropyl alcohol, butanol and the like; alkoxy alcohols such as 2-methoxy ethanol, 2-ethoxy ethanol, 1-methoxy-2-propanol and the like; ketones such as acetone, methyl ethyl ketone, methyl isobutyl ketone, methyl propyl ketone, cyclohexanone and the like; ethers such as propyleneglycol monopropyl ether, propyleneglycol monomethyl ether, ethyleneglycol monoethyl ether, ethyleneglycol monopropyl ether, ethyleneglycol monobutyl ether, diethyleneglycol monomethyl ether, diethyleneglycol monoethyl ether, diethyleneglycol monopropyl ether, diethyleneglycol monobutyl ether, diethyleneglycol-2-ethylhexyl ether and the like; and aromatic solvents such as benzene, toluene, xylene and the like. These organic solvents may be used alone or in combination.

According to an embodiment of the present invention, the hard coating film may be obtained by applying the hard coating composition comprising the above-mentioned components onto at least one side of the supporting substrate, and then photocuring the hard coating composition to form the hard coating layer. As such, any method for applying the hard coating composition that is available in the art may be used without particular limitations. For example, the hard coating composition may be applied by bar coating, knife coating, roll coating, blade coating, die coating, micro-gravure coating, comma coating, slot die coating, lip coating, solution casting or the like.

After being completely cured, the hard coating layer has a thickness of about 50 μm or more, for example, about 50 to about 300 μm, about 50 to about 200 μm, about 50 to about 150 μm, or about 70 to about 150 μm. According to the present invention, a hard coating film having high hardness can be manufactured without the formation of curls or cracks even when the hard coating layer is formed to the above thickness.

In one embodiment of the present invention, the hard coating layer may be formed only on one side of the supporting substrate.

In another embodiment of the present invention, the hard coating layer may be formed on each of both sides of the supporting substrate.

The formation of the hard coating layer on each of both sides of the supporting substrate may be carried out as follows.

In one embodiment of the present invention, a hard coating film may be formed via two steps including applying a first hard coating composition onto one side of the supporting substrate and photocuring it, followed by applying a second hard coating composition onto the other side of the substrate and photocuring it. In this context, the first and second hard coating compositions are the same as the hard coating composition as above and are just terminologically discriminated for application to one and the other side of the substrate. Any method for applying the hard coating composition that is available in the art may be used without particular limitations. For example, the hard coating composition may be applied by bar coating, knife coating, roll coating, blade coating, die coating, micro-gravure coating, comma coating, slot die coating, lip coating, solution casting or the like.

In the latter photocuring step, UV light is radiated onto a side opposite the side coated with the first hard coating composition. Thus, the curl which may be generated by setting shrinkage in the former photocuring step is counterbalanced to afford a flat hard coating film. No additional flattening processes are thus needed.

In another embodiment of the present invention, a hard coating film may be formed by applying a hard coating composition onto both sides of the supporting substrate in a simultaneous manner by bar coating and curing it.

The hard coating film may be laminated on the polarizer using an adhesive or the like, thereby adhering them. The adhesive useful therein is not particularly limited so long as it is known in the art. Examples of the adhesive may include a one-part or two-part PVA adhesive, a polyurethane adhesive, an epoxy adhesive, a styrene butadiene rubber (SBR) adhesive, a hot melt adhesive, etc., but the present invention is not limited thereto.

According to an embodiment of the present invention, when the hard coating film is disposed on a plane after exposure to a temperature of 50° C. or higher at a humidity of 80% or higher for 70 hrs or longer, the maximum distance at which each edge or side of the hard coating film is spaced apart from the plane may be about 1.0 mm or less, about 0.6 mm or less, or about 0.3 mm or less. More particularly, when the hard coating film of the present invention is disposed on a plane after exposure to a temperature of 50 to 90° C. at a humidity of 80 to 90% for 70 to 100 hrs, each edge or side of the hard coating film is spaced apart from the plane by about 1.0 mm or less, about 0.6 mm or less, or about 0.3 mm or less, maximally.

Therefore, the polarizing plate according to the present invention may exhibit high hardness, scratch resistance, transparency, durability, light resistance, and light transmittance, and may thus be efficiently utilized in a variety of fields.

The polarizing plate including the hard coating film of the present invention may have superior impact resistance. For example, the polarizing plate of the present invention may not crack when a 22 g steel ball is freely dropped ten times thereon from a height of 50 cm.

Also, the hard coating film of the polarizing plate according to the present invention may have a pencil hardness of 7H or more, 8H or more, or 9H or more at a load of 1 kg.

Furthermore, after the hard coating film of the polarizing plate according to the present invention is tested by double rubbing 400 times with a steel wool #0000 under a load of 500 g on a friction tester, only two or less scratches may appear.

Also, the polarizing plate of the present invention may have a light transmittance of 41% or more, and a haze of 1.0% or less, 0.5% or less, or 0.4% or less.

Also, the hard coating film of the polarizing plate according to the present invention may have an initial color b value of 1.0 or less. After the hard coating film is exposed to UV-B under an ultraviolet lamp for 72 hrs or longer, it may have a color b* value which differs from the pre-exposed color b* value by 0.5 or less, or by o.4 or less.

The polarizing plate including the hard coating film according to the present invention may be utilized in a variety of fields, for example, in mobile terminals, smart phones, other mobile devices, display devices, electronic blackboards, outdoor billboards, and various display parts. In accordance with one embodiment, the polarizing plate of the present invention may be a polarizing plate for TN (Twisted Nematic) and STN (Super Twisted Nematic) liquid crystals, a polarizing plate for horizontal alignment modes such as IPS (In-Plane Switching), Super-IPS, FFS (Fringe Field Switching), etc., or a polarizing plate for vertical alignment modes.

A better understanding of the present invention may be obtained through the following examples which are set forth to illustrate, but are not to be construed as limiting the present invention.

EXAMPLES

Preparation Example 1

In a reactor, 50 g of a caprolactone-grafted polyrotaxane polymer [A1000, Advanced Soft Material INC] was mixed with 4.53 g of Karenz-AOI [2-acryloylethyl isocyanate, Showadenko Inc.], 20 mg of dibutyltin dilaurate [DBTDL, Merck], 110 mg of hydroquinone monomethylene ether, and 315 g of methyl ethyl ketone. Then, the mixture was reacted at 70° C. for 5 hr to obtain polyrotaxane in which polylactone with an acrylate moiety conjugated to the end thereof acting as the macrocycle while cyclodextrin was positioned as the stopper.

The polyrotaxane had a weight average molecular weight of 600,000 g/mol, and was found to have an elongation of 20%, as measured by ASTM D638.

A hard coating composition was prepared by mixing 9 g of a silica-dipentaerythritolhexaacrylate (DPHA) composite in which silica nanoparticles with a particle size of 20~30 nm were dispersed by 40 wt % (silica 3.6 g, DPHA 5.4 g), 1 g of the polyrotaxane as above, 0.2 g of a photoinitiator (brand name: Darocur TPO), 0.1 g of a benzotriazole-based yellowing inhibitor (brand name: Tinuvin 400), and 0.05 g of a fluorine surfactant (brand name: FC4430).

The hard coating composition was applied onto both sides of a TAC substrate 60 μm thick using a bar coating process. The substrate whose both sides were coated with the hard coating composition was passed between the upper and lower metal halide lamps having a wavelength of 290~320 nm of a UV irradiator so as to be photocured, thereby completing a hard coating film.

After completion of the curing, each of the hard coating layers formed on both sides of the substrate was 100 μm thick.

Preparation Example 2

A hard coating film was manufactured in the same manner as in Preparation Example 1, with the exception that 1 g of a urethane acrylate polymer (brand name: UA200PA, Shin Nakamura Chemical Co. Ltd., weight average molecular weight: 2,600 g/mol, elongation measured by ASTM D638: 170%) was used instead of 1 g of the polyrotaxane.

Preparation Example 3

A hard coating film was manufactured in the same manner as in Preparation Example 1, with the exception that 1 g of a urethane acrylate polymer (brand name: UA340P, Shin Nakamura Chemical Co. Ltd., weight average molecular weight: 13,000 g/mol, elongation measured by ASTM D638: 150%) was used instead of 1 g of the polyrotaxane.

Preparation Example 4

A hard coating film was prepared in the same manner as in Preparation Example 1, with the exception that each of the hard coating layers formed on both sides of the substrate after completion of the curing in Preparation Example 1 was 150 μm thick.

Comparative Preparation Example 1

A hard coating film was manufactured in the same manner as in Preparation Example 1, with the exception that a hard coating composition was prepared by mixing 10 g of a silica-dipentaerythritolhexaacrylate (DPHA) composite in which silica nanoparticles with a particle size of 20~30 nm were dispersed by 40 wt % (silica 4 g, DPHA 6 g), 0.1 g of a benzotriazole-based yellowing inhibitor (brand name: Tinuvin 400) and 0.05 g of a fluorine surfactant (brand name: FC4430).

Example 1

A PVA resin film was stretched, dyed with iodine, and treated with a boric acid aqueous solution, thus preparing a polarizer. Subsequently, a TAC (Triacetyl cellulose) film 60 μm thick was attached to one side of the polarizer using an aqueous PVA adhesive. Subsequently, the hard coating film of Preparation Example 1 was laminated onto a side opposite the side having the TAC film using an aqueous PVA adhesive, and adhered thereto by drying the adhesive, thereby manufacturing a polarizing plate.

Example 2

A polarizing plate was manufactured in the same manner as in Example 1, with the exception that the hard coating film of Preparation Example 2 was used.

Example 3

A polarizing plate was manufactured in the same manner as in Example 1, with the exception that the hard coating film of Preparation Example 3 was used.

Example 4

A polarizing plate was manufactured in the same manner as in Example 1, with the exception that the hard coating film of Preparation Example 4 was used.

Comparative Example 1

A polarizing plate was manufactured in the same manner as in Example 1, with the exception that the hard coating film of Comparative Preparation Example 1 was used.

The components and amounts of the hard coating layers of Examples 1 to 4 are summarized in Table 1 below.

TABLE 1

| | Acrylate monomer (unit: g) | | Photocurable elastic polymer (unit: g) | | Inorganic particles (unit: g) | Thickness of Hard coating layer |
|---|---|---|---|---|---|---|
| Ex.1 | DPHA | 5.4 g | Polyrotaxane | 1 g | 3.6 g | 100 μm |
| Ex.2 | DPHA | 5.4 g | UA200PA | 1 g | 3.6 g | 100 μm |
| Ex.3 | DPHA | 5.4 g | UA340P | 1 g | 3.6 g | 100 μm |

TABLE 1-continued

| | Acrylate monomer (unit: g) | | Photocurable elastic polymer (unit: g) | Inorganic particles (unit: g) | Thickness of Hard coating layer |
|---|---|---|---|---|---|
| Ex.4 | DPHA | 5.4 g | Polyrotaxane 1 g | 3.6 g | 150 μm |
| C.Ex.1 | DPHA | 6 g | — | 4 g | 100 μm |

Test Examples

Measurement Method

1) Pencil Hardness

The hard coating film of the polarizing plate was evaluated for pencil hardness according to the Japanese Standard JIS K5400. In this regard, the hard coating film was doubly rubbed three times with a pencil hardness meter under a load of 1.0 kg to determine the hardness at which no scratches appeared.

2) Scratch Resistance

The hard coating film of the polarizing plate was doubly rubbed 400 times with a steel wool (#0000) under a load of 0.5 kg on a friction tester, and scratches thus formed on the hard coating film were counted. Evaluation was made of the scratch resistance of the films by marking ○ for two or less scratches, Δ for two to less than five scratches, and X for five or more scratches.

3) Light Resistance

Differences in color b value of the hard coating films were measured before and after exposure to UV-B from UV lamp for 72 hrs or longer.

4) Transmittance and Haze

The hard coating films were measured for transmittance and haze using a spectrophotometer (brand name: COH-400).

5) Curl Property at High Humidity and Temperature

After a hard coating film piece with dimensions of 10 cm×10 cm was stored for 72 hr in a chamber maintained at a temperature of 85° C. and a humidity of 85%, it was placed on a flat plane. A maximal distance at which each edge of the piece was apart from the plane was measured.

6) Cylindrical Bending Test

Each of the hard coating films was wound on a cylindrical mandrel having a diameter of 3 cm. When the hard coating film was not cracked, it was evaluated as OK. If the hard coating film was cracked, it was evaluated as X.

7) Impact Resistance

The impact resistance of each of the hard coating films was evaluated by determining whether or not each of the hard coating films was cracked when a 22 g steel ball was freely dropped ten times on the hard coating film from a height of 50 cm. Each of the hard coating films was evaluated as OK when it was not cracked, and as X when cracked.

The results of the physical properties measured in each of the hard coating films are summarized in Table 2 below.

TABLE 2

| | Ex. 1 | Ex. 2 | Ex. 3 | Ex. 4 | C.Ex. 1 |
|---|---|---|---|---|---|
| Pencil Hardness | 9H | 9H | 8H | 9H | 9H |
| Scratch Resistance | ○ | ○ | ○ | ○ | ○ |
| Light Resistance | 0.20 | 0.25 | 0.21 | 0.22 | 0.35 |
| Transmittance | 42.0 | 42.2 | 42.8 | 42.1 | 43.0 |
| Haze | 0.3 | 0.2 | 0.3 | 0.3 | 0.4 |
| Bending Test | OK | OK | OK | OK | OK |
| Curl property at High Humidity & Temperature | 0.0 mm | 0.0 mm | 0.0 mm | 0.0 mm | 0.0 mm |
| Impact Resistance | OK | OK | OK | OK | X |

As is apparent from Table 2, the hard coating films or polarizing plates of the examples were good in all the physical properties.

What is claimed is:

1. A polarizing plate, comprising:
a polarizer; and
a hard coating film formed on at least one side of the polarizer, the hard coating film comprising a supporting substrate and a hard coating layer formed on at least one side of the supporting substrate, the hard coating layer comprising a photocurable crosslinking copolymer of a tri- to hexa-functional acrylate monomer and a photocurable elastic polymer and inorganic particles dispersed in the photocurable crosslinking copolymer,
wherein the photocurable elastic polymer comprises at least one selected from the group consisting of polycaprolactone, a urethane acrylate polymer and polyrotaxane,
wherein the polyrotaxane comprises a cyclic moiety (macrocycle) in which lactone compounds with a (meth)acrylate moiety conjugated to the end thereof are bonded each other; a thread moiety held within the macrocycle; and stoppers provided at both ends of the thread moiety so as to prevent dissociation of the macrocycle.

2. The polarizing plate of claim 1, wherein the photocurable crosslinking copolymer comprises 5 to 20 weight parts of the photocurable elastic polymer and 80 to 95 weight parts of the tri- to hexa-functional acrylate monomer, based on 100 weight parts of the photocurable crosslinking copolymer.

3. The polarizing plate of claim 1, wherein the photocurable elastic polymer has an elongation of 15 to 200%, as measured by ASTM D638.

4. The polarizing plate of claim 1, wherein the hard coating layer comprises 40 to 90 weight parts of the photocurable crosslinking copolymer and 10 to 60 weight parts of the inorganic particles, based on 100 weight parts of the hard coating layer.

5. The polarizing plate of claim 1, wherein the inorganic particles have a particle size of 100 nm or less.

6. The polarizing plate of claim 1, wherein the inorganic particles includes at least one selected from the group consisting of silica nanoparticles, aluminum oxide particles, titanium oxide particles, zinc oxide particles and a combination thereof.

7. The polarizing plate of claim 1, wherein the tri- to hexa-functional acrylate monomer comprises at least one selected from the group consisting of trimethylolpropane triacrylate (TMPTA), trimethylolpropane ethoxy triacrylate (TMPEOTA), glycerin-propoxylated triacrylate (GPTA), pentaerythritol tetraacrylate (PETA) and dipentaerythritol hexaacrylate (DPHA).

8. The polarizing plate of claim 1, further comprising an additive dispersed or crosslinked in the photocurable crosslinking copolymer.

9. The polarizing plate of claim 8, wherein the additive includes a surfactant, which is dispersed or crosslinked in the photocurable crosslinking copolymer and comprises at least one selected from the group consisting of a mono- to bi-functional fluoro-acrylate, a fluorine surfactant and a silicon surfactant.

10. The polarizing plate of claim 8, wherein the additive includes a yellowing inhibitor, which is dispersed in the photocurable crosslinking copolymer and comprises a benzophenone compound or a benzotriazole compound.

11. The polarizing plate of claim 1, wherein the supporting substrate includes at least one selected from consisting of polyethyleneterephthalate (PET), ethylene vinyl acetate (EVA), a cyclic olefin polymer (COP), a cyclic olefin copolymer (COC), polyacrylate (PAC), polycarbonate (PC), polyethylene (PE), polymethylmethacrylate (PMMA), polyetheretherketone (PEEK), polyethylenenaphthalate (PEN), polyetherimide (PEI), polyimide (PI), triacetylcellulose (TAC), methyl methacrylate (MMA) and a fluorine resin.

12. The polarizing plate of claim 1, which is configured such that the hard coating film is formed on one side of the polarizer and a protective film is formed on the other side of the polarizer.

13. The polarizing plate of claim 12, wherein the protective film is a triacetylcellulose (TAC) film.

* * * * *